April 13, 1954 L. PETERSON 2,674,766
STOWAGE BIN OR CRIB
Filed Oct. 3, 1952
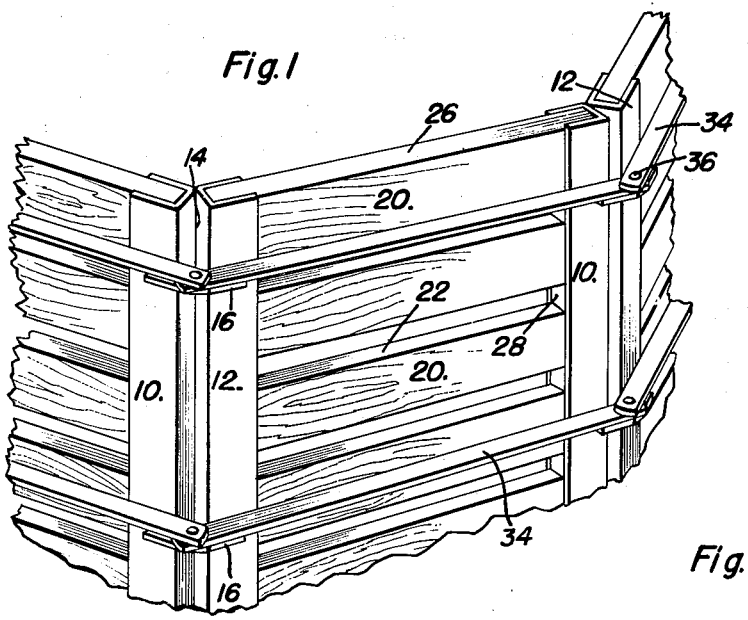
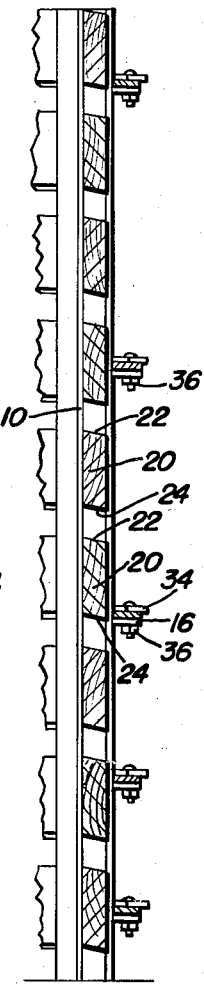
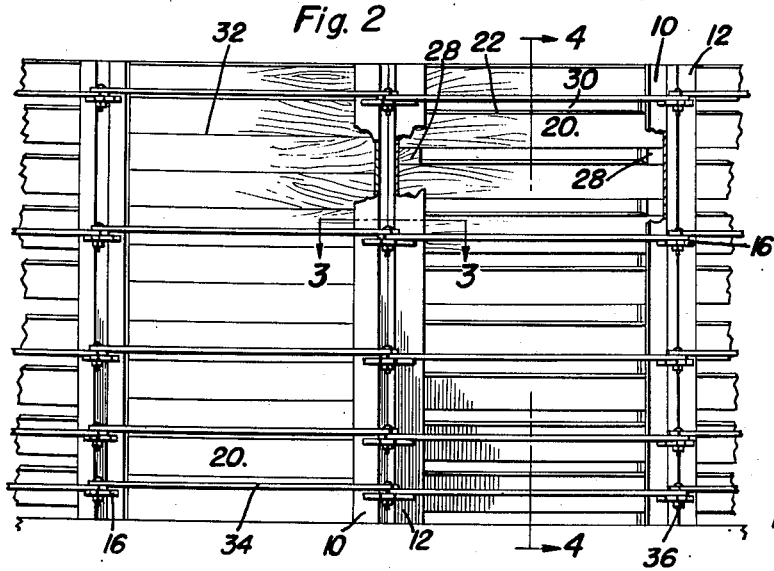
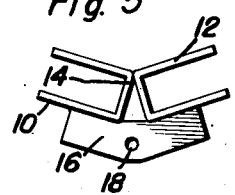
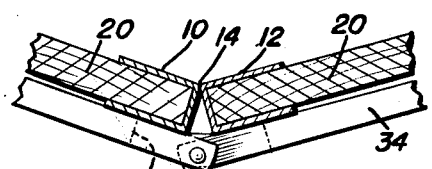
Lewis Peterson
INVENTOR.

Patented Apr. 13, 1954

2,674,766

UNITED STATES PATENT OFFICE 2,674,766

STOWAGE BIN OR CRIB

Lewis Peterson, Waukon, Iowa

Application October 3, 1952, Serial No. 312,957

5 Claims. (Cl. 20—1.2)

This invention relates to stowage bins or cribs for use on farms for various agricultural purposes and has for its particular object the provision of a stowage bin or crib that may be readily prefabricated for convenient transportation to such location as desired and which then may be easily and speedily erected.

Extra cribs or bins for the stowage of corn, grain, hay, potatoes and many agricultural products are necessary only for a short period of time prior to the transportation of the crop to market. These cribs or bins are not only unsightly and expensive to maintain when subjected to weathering, but lack versatility of use and occupy a considerable amount of space. It is therefore another important object of the invention to provide a stowage bin or crib that may be readily disassembled after it has served its purpose and which may be stowed in a relatively small compass.

Another object of this invention lies in the provision of a stowage bin or crib that is versatile in its utility since it employs means for converting the crib from a ventilated structure to a substantially rain and wind proof building.

The construction of this invention features the use of pairs of angularly disposed studs which are welded to each other at abutting corners. Side boards which have beveled or inclined upper and bottom surfaces are slidably received within the channel framework of the vertical studs. Spacer blocks are used for selectively alternatively spacing the side boards to form a ventilated structure. Brackets are welded to the channel shaped members to both rigidify the structure and to provide means for securing the tie rods which hold the pairs of channel shaped studs in their desired relationship.

Still further objects of the invention reside in the provision of a stowage bin or crib that is strong, durable, highly efficient in use, simple and inexpensive to manufacture, and which is of manifold utility on a farm.

These, together with various and ancillary objects of the invention which will become apparent as the following description proceeds, are attained by this stowage bin or crib, a preferred embodiment of which has been illustrated in the accompanying drawings, by way of example only, wherein:

Figure 1 is a perspective view showing the invention assembled for use as a corn crib or other like purpose;

Figure 2 is a side elevational view of the structure comprising the present invention, with parts being broken away to show other parts in greater detail, the various elements of the invention being so arranged as to illustrate the structure's utility both as a ventilated bin or crib, and as a substantially wind and rain proof building;

Figure 3 is a horizontal sectional view as taken along the plane of line 3—3 in Figure 2 and showing in particular the construction of the brackets and tie rods used in securing the various elements of the invention together;

Figure 4 is a vertical sectional view as taken along the plane of line 4—4 in Figure 2, the figure being drawn in an enlarged scale to show particularly the inclined upper and lower surfaces of the side boards and spacer blocks; and Figure 5 is a top plan view of one of the stud members used in the present invention.

With continuing reference to the accompanying drawings wherein like reference numerals designate similar parts throughout the various views, reference numerals 10 and 12 generally represent and indicate each of a pair of vertically extending studs which are channel shaped. These channel shaped studs 10 and 12 are angularly disposed relative and positioned in abutting relationship with the corners as at 14 welded to each other. Brackets 16 are provided and these are welded to the studs 10 and 12. Apertures 18 are formed in the brackets 16.

A plurality of side boards or side members 20 are provided and are adapted to extend between spaced pairs of the vertically extending combined channel shaped studs 10 and 12. The ends of the side boards 20 are slidably received within the confines of the channel shaped members 12 and 10 of these pairs of studs. As can be readily seen from an inspection of Figure 4, the side boards 20 are provided with inclined top and bottom surfaces 22 and 24 respectively. However, the upper surface 26 of the uppermost side board may be formed with a horizontal surface if it is so desired. There are provided substantially rectangular spacer blocks 28 which also are provided with inclined upper and lower surfaces. These spacer blocks may be received between side boards 20 to vertically space the side boards 20 from each other in an alternating manner so as to provide openings 30 between the side boards for ventilation of the crib or bin. However, if it is desired to eliminate the openings 30 so as to provide a substantially rain proof and wind proof building, the side boards 20 may be positioned one on another so as to form a joint as at 32 that is inclined upwardly toward the interior so as to substantially prevent any rain or wind from entering into the crib. Furthermore, providing the inclined surfaces 22 and 24 for the side boards 20 also forms a substantial interlock when the side boards are placed within the confines of the channels 10 and 12. It is to be noted that the spacer blocks 28 are preferably of no greater size than the periphery of the channel studs 10 and 12 so as to be completely retained within the studs. This feature is highly advantageous since it prevents the possible accidental dislocation of one of these spacer blocks. Thus, the channel members 10 and 12 will provide a guard for the spacer blocks 28.

In order to tie and reinforce this building together, the brackets 16 have been provided which are spaced together at closer intervals at the bottom portions of the building than they are at the top portions. This is in order to accommodate the greater pressure exerted by the weight of corn or grain piled in the crib. There are provided suitable straps or tie rods 34 which extend between the brackets 16 of adjacent combined studs 10 and 12. These straps are provided with suitable apertured ends for reception of a bolt fastener 36 which extends through the ends of adjoining straps so as to securely tie the entire structure together.

This structure may be erected by spacing the combined studs 10 and 12 from each other and then securing the tie rods to the brackets 16. Then the side boards may be positioned in the assembly desired. Since from the foregoing, the construction and advantages of this stowage bin or crib are readily apparent, further description is deemed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to which fall within the scope of the appended claims.

What is claimed as new is as follows:

1. A bin construction comprising a pair of channel shaped studs, said studs being angularly disposed relative to each other and being positioned and welded to each other in abutting relationship, side members slidably received in said studs, and spacer blocks slidably received in said studs, said side members being arranged in vertically alternating relationship with said spacer blocks, a plurality of spaced brackets secured to and extending between said studs, apertures in said brackets, tie rods on said brackets extending parallel to said side members, apertures in said tie rods, and fasteners extending through said tie rods and said brackets to secure said tie rods to said brackets.

2. A bin construction comprising a pair of channel shaped studs, said studs being angularly disposed relative to each other and being positioned and welded to each other in abutting relationship, side members slidably received in said studs, and spacer blocks slidably received in said studs, said side members being arranged in vertically alternating relationship with said spacer blocks, said side members each having angularly inclined upper and lower surfaces to form an interlock arrangement, a plurality of spaced brackets secured to and extending between said studs, apertures in said brackets, tie rods on said brackets extending substantially parallel to said side members, apertures in said tie rods, and fasteners extending through said tie rods and said brackets to secure said tie rods to said brackets.

3. A bin construction comprising a pair of channel shaped studs, said studs being angularly disposed relative to each other and being positioned and welded to each other in abutting relationship, side members slidably received in said studs, and spacer blocks slidably received in said studs, said side members being arranged in vertically alternating relationship with said spacer blocks, a plurality of spaced brackets secured to and extending between said studs, tie rods extending substantially parallel to said side members, and fasteners securing said tie rods to said brackets.

4. A bin construction comprising a pair of channel shaped studs, said studs being angularly disposed relative to each other and being positioned and welded to each other in abutting relationship, side members slidably received in said studs, and spacer blocks slidably received in said studs, said side members being arranged in vertically alternating relationship with said spacer blocks, said spacer blocks being wholly contained within the periphery of said studs, said side members each having angularly inclined upper and lower surfaces to form an interlock arrangement, a plurality of spaced brackets secured to and extending between said studs, apertures in said brackets, tie rods on said brackets extending substantially parallel to said side members, apertures in said tie rods, and fasteners extending through said tie rods and said brackets to secure said tie rods to said brackets.

5. A bin construction comprising a pair of channel shaped studs, said studs being angularly disposed relative to each other and being positioned and welded to each other in abutting relationship, side members slidably received in said studs, and spacer blocks slidably received in said studs, said side members being arranged in vertically alternating relationship with said spacer blocks, said spacer blocks being wholly contained within the periphery of said studs, a plurality of spaced brackets secured to and extending between said studs, apertures in said brackets, tie rods on said brackets extending substantially parallel to said side members, apertures in said tie rods, and fasteners extending through said tie rods and said brackets to secure said tie rods to said brackets.

References Cited in the file of this patent

UNITED STATES PATENTS

| Number | Name | Date |
|---|---|---|
| 865,404 | Laurent | Sept. 10, 1907 |
| 1,125,249 | Archer | Jan. 19, 1915 |
| 1,129,658 | Foy | Feb. 23, 1915 |
| 1,491,328 | Albin | Apr. 22, 1924 |
| 2,378,267 | Waller | June 12, 1945 |
| 2,505,903 | Madger | May 2, 1950 |